United States Patent
Duda et al.

[11] Patent Number: 5,839,646
[45] Date of Patent: Nov. 24, 1998

[54] PROCESS FOR MANUFACTURING HARD-SOLDERED ALUMINUM HEAT EXCHANGERS

[75] Inventors: Bernd Duda, Muehlacker; Klaus Lorenz, Stuttgart; Cord Voelker, Backnang, all of Germany

[73] Assignee: Behr GmbH & Co., Stuttgart, Germany

[21] Appl. No.: 771,921

[22] Filed: Dec. 23, 1996

[30] Foreign Application Priority Data

Dec. 22, 1995 [DE] Germany .................. 195 48 244.1

[51] Int. Cl.⁶ .............................. B23K 1/19; B23K 31/02; B23K 101/14
[52] U.S. Cl. ....................................... 228/183; 228/262.51
[58] Field of Search ............................ 228/183, 262.51; 29/890.054

[56] References Cited

U.S. PATENT DOCUMENTS

| 3,853,547 | 12/1974 | Singleton, Jr. ............ 228/262.51 |
| 5,295,302 | 3/1994 | Takai et al. ............... 228/183 |

FOREIGN PATENT DOCUMENTS

| 0 131 444 | 1/1985 | European Pat. Off. . |
| 0 632 245 | 1/1995 | European Pat. Off. . |
| 26 14 872 | 10/1976 | Germany . |
| 37 13 781 | 11/1987 | Germany . |
| 41 20 748 | 1/1993 | Germany . |
| 41 29 215 | 3/1993 | Germany . |
| 93 18 525.1 | 5/1995 | Germany . |
| 59-113969 | 6/1984 | Japan .................. 228/262.51 |
| 1 410 086 | 10/1975 | United Kingdom . |
| 2157995 | 11/1985 | United Kingdom .......... 228/183 |

OTHER PUBLICATIONS

Japanese Abstract No. 07032133, Feb. 3, 1995.
Japanese Abstract No. 1–249261, M–913 Dec. 26, 1989 vol. 13/No. 591.

Primary Examiner—P. Austin Bradley
Assistant Examiner—Jeffrey T. Knapp
Attorney, Agent, or Firm—Evenson, McKeown, Edwards & Lenahan, P.L.L.C.

[57] ABSTRACT

A process for manufacturing hard-soldered aluminum heat exchangers is provided. For heat exchangers which are provided with flat tubes of a narrow interior with, known soldering processing operating with a fluxing agent cannot be used or can only be used with extreme difficulty. For such flat tubes, and optionally for turbulence inserts which can be slid into such flat tubes, certain materials and coatings are provided which result in a soldered connection in the tube interior where, according to the new process, no fluxing agent is used.

12 Claims, 2 Drawing Sheets

PROCESS FOR MANUFACTURING HARD-SOLDERED ALUMINUM HEAT EXCHANGERS

BACKGROUND AND SUMMARY OF THE INVENTION

This invention relates to a process for manufacturing hard-soldered aluminum heat exchangers in which a solder-containing layer and a non-corroding fluxing agent are deposited on the exterior surfaces of flat tubes and, after a drying via heating in an inert atmosphere, particularly in a nitrogen atmosphere, a connection with other parts is caused.

It is known from German Patent Document DE-A-26 14 872 to solder aluminum components or aluminum alloy components to one another. A potassium fluoaluminate flux and an aluminum solder alloy as an aqueous slurry of finely divided flux and metal powder are applied to at least one of the components to be soldered together. The applied film is dried and the components are then soldered together by heating in an inert gas atmosphere. This soldering process known under the name "NOCOLOK" process, in the case of which fluxing agent residues do not have to be removed after the soldering, has increasingly been used in practice for the manufacturing of aluminum heat exchangers. Since a fluxing agent must be used which, as a rule, is sprayed on and must then dry, difficulties arise where the fluxing agent must be entered into narrow cross-sections. This takes place, for example, when heat exchangers are to be made from flat tubes of a narrow interior width, such as heat exchangers for air conditioners. In the case of such thin tubes, the fluxing agent cannot be brought into the interior of the tubes and then be dried again or can be entered there only at very high expenditures.

An aluminum heat exchanger has therefore become known from German Patent document DE U 93 18 525 in which, in order to enter the fluxing agent, for example, between the domes of continuous beads which are placed on one another or of naps pressed into the interior of the tube which are used for forming a continuous separating wall or for forming supports and turbulence baffles, it is provided that cylindrical or spherical surface parts are formed on the points which rest on one another which can be supplied with the fluxing agent from the outside through openings. This fluxing agent penetrates into the capillary gaps formed there. However, heat exchangers which are constructed in this manner require relatively high expenditures and are also subject to the risk that insufficient soldering joints will occur because the fluxing agent has not dried sufficiently in the interior of the flat tubes before they are soldered together.

There is therefore needed a process of the above-mentioned type by which the interior side of such flat tubes no longer has to be provided with a fluxing agent, without otherwise having to deviate from the known soldering process.

For solving this task according to the present invention, during the process of the above-mentioned type, flat tubes made of an aluminum alloy are used which are provided on the outside with a solder coating on an AlSi alloy, but are bare of the inside and are provided with turbulence inserts which have a coating of an AlSi alloy and an addition of from 0.2 to 1.5% magnesium on both sides.

Surprisingly, it was found that, despite the use of magnesium additions which are normally not desirable for the known "NOCOLOK" soldering process, no disadvantageous consequences occur for the soldering process and, surprisingly, a durable and firm soldered connection of the interior tube parts not provided with fluxing agent can take place also in a soldering furnace operating according to the NOCOLOK process. However, the use of tubes and turbulence inserts prepared in such a manner has the result that the normal and advantageous soldering process can be maintained, without the requirement of a fluxing agent coating in the tube interior. The new process can therefore be carried out in a very simple and effective manner in that the exterior sides of the tube are sprayed in a known manner with the non-corroding fluxing agent while the open tube sides are kept sealed during this operation. Subsequently, the drying and then the soldering operation can be initiated in the usual manner.

The new process is particularly suitable for flat tubes with a narrow interior width, for example, of a size of a few millimeters. It was found to be advantageous for the exterior solder coating of the flat tubes to have a layer thickness of approximately 10% of the tube wall thickness and for the coating of the turbulence inserts to have a layer thickness of approximately 10% of the thickness of the turbulence plates.

The idea of using of certain flat tubes for manufacturing hard-soldered (i.e., BRAZED) aluminum heat exchangers, can be used not only for the manufacturing of heat exchangers with flat tubes with turbulence inserts, but also in the case of a process for the manufacturing of hard-soldered aluminum heat exchangers in which flat aluminum tubes in the manner of the previously mentioned heat exchanger according to German Patent document DE U 93 18 525 are provided with beads which are laterally pressed-in by approximately half the interior width and which, after the soldering, become a continuous supporting wall.

In this case, flat tubes welded according to the present invention are used which consist of alloys suitable for the Nocolok process and which are provided on the outside with a solder coating on an AlSi alloy, and of the inside with a coating of an AlSi alloy with an addition of 0.2 to 1.5% magnesium. In this case, the coating can take place in a known manner before the welding-together of the flat tubes. It was found that also in this case the tubes need to be provided with the fluxing agent only on the outside while a durable and firm soldering takes place on. the inside also without any fluxing agent.

Also in this case, it was found to be expedient for coatings to take place in specific layer thicknesses. Thus, it is advantageous for the interior coating of the flat tubes to have a layer thickness of approximately 5% of the tube wall thickness and for the exterior coating to have a layer thickness of approximately 10% of the tube wall thickness. Flat tubes which are constructed in this manner, like the flat tubes of the above mentioned type which have turbulence inserts, can be connected in a known fashion with corrugated ribs provided between the tubes and with tube bottoms.

Other objects, advantages and novel features of the present invention will become apparent from the following detailed description of the invention when considered in conjunction with the accompanying drawings.

DETAILED DESCRIPTION OF THE DRAWINGS

Figure 1:
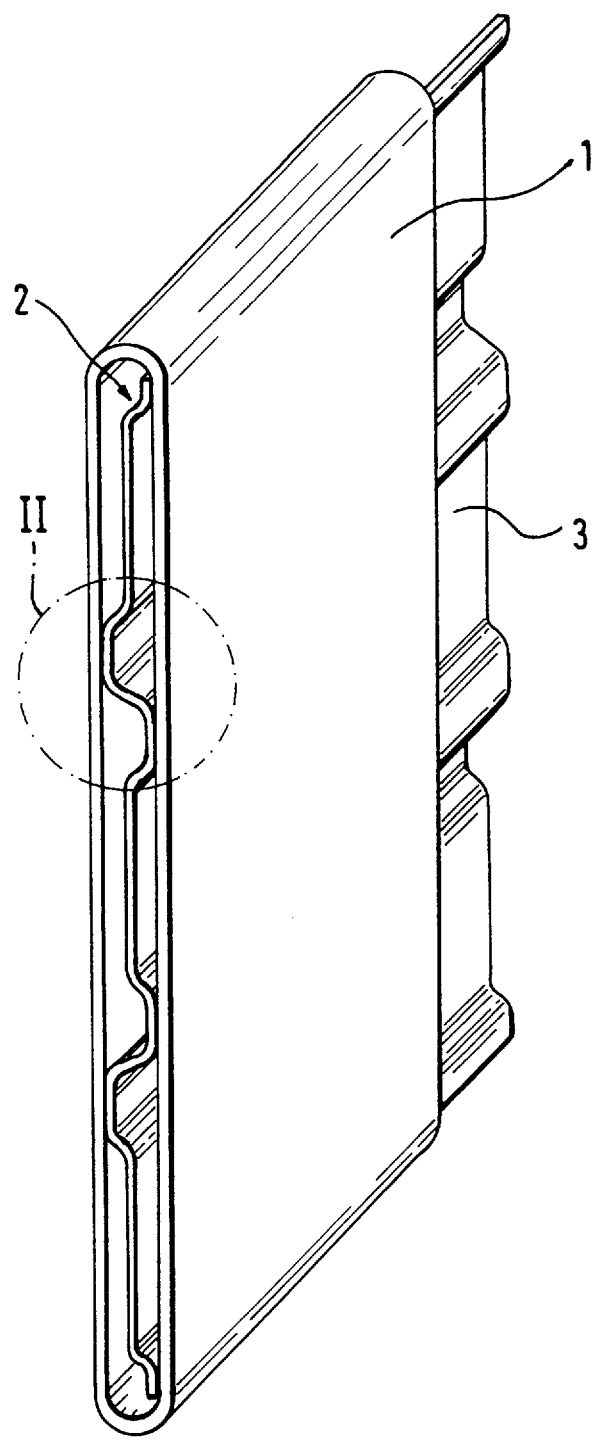
FIG. 1 is a schematic perspective representation of a flat tube with a turbulence insert which can be soldered according to the process of the invention.
Figure 2:
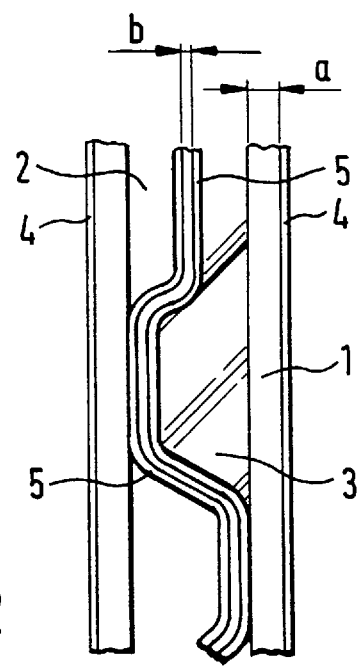
FIG. 2 is an enlargement of the cutout II in FIG. 1.

FIGS. 1 and 2 illustrate a flat tube 1 made of an aluminum manganese copper alloy (AlMnCu) whose interior cavity 2 is provided with a turbulence insert 3. The flat tube 1, which may also consist of other alloys suitable for the Nocolok process, such as Al, AlMn, in a manner not shown in detail, is coated on its exterior side with a layer 4 whose layer thickness corresponds to approximately 10% of the thickness "a" of the tube wall of the flat tube 1. This solder coating layer 4 is manufactured of an AlSi alloy and may, for example, be AlSi 10. The interior side of the flat tube 1, that is, the side bounding the interior space 2, is bare.

The turbulence insert 3 slid into the interior space 2 also consists of AlMnCu and is plated on both sides with a layer 5 which is an AlSi alloy and is provided with an addition of 0.2 to 1.5% magnesium. In this case, the thickness of the coating layer 5 of the turbulence insert 3 amounts to approximately 10% of the thickness "b" of the turbulence plate 3.

For manufacturing a heat exchanger, the thus constructed flat tube is combined in the known manner with other flat tubes, the tube bottoms, optionally the collecting tanks, and the corrugated ribs to be provided between the flat tubes to form the heat exchanger. It is then degreased. The tube openings on both sides are then covered, and the exterior walls are acted upon by the fluxing agent by means of the layer 4. After the subsequent drying, the prepared heat exchanger can be charged into the soldering furnace and can be soldered to its final form according to the known process by a relatively short heating to approximately 600° C.

It was also found that the turbulence insert 3 placed in the tube interior enters into a firm connection with the flat tube 1, even though no fluxing agent was provided there.

Figure 3:
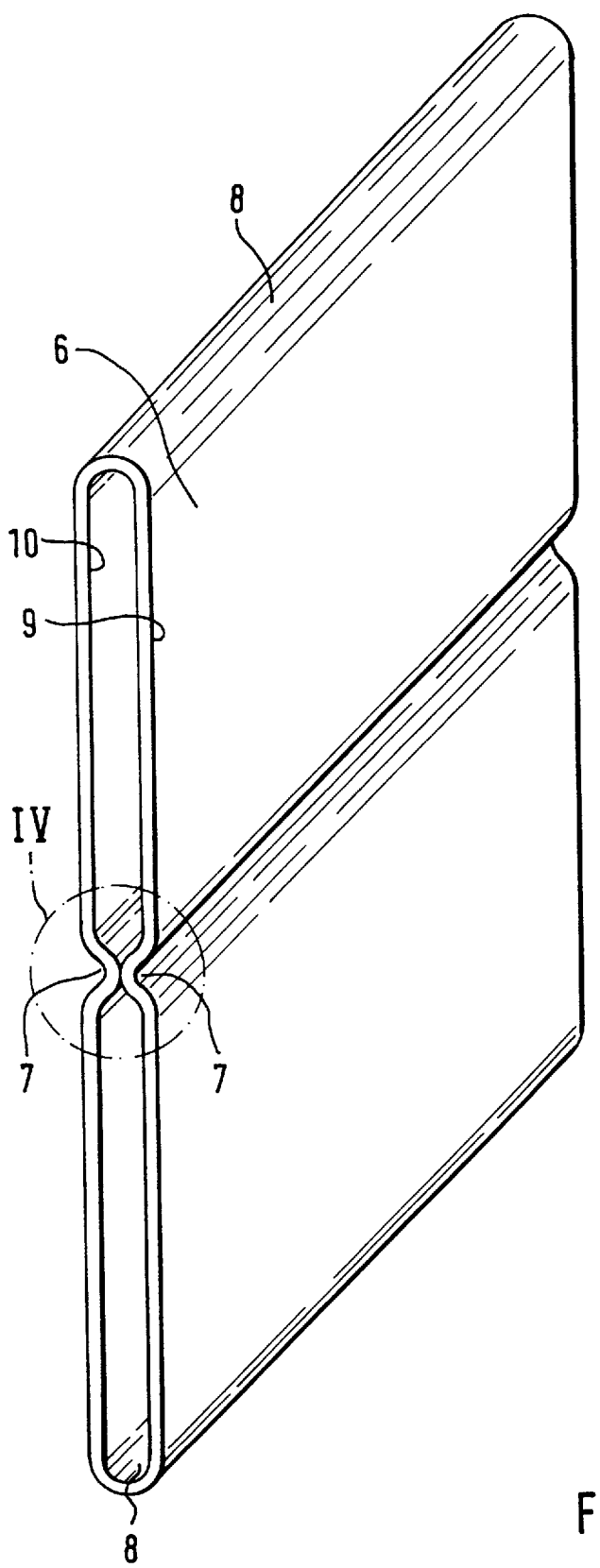
FIG. 3 is a schematic perspective representation of a flat tube with an interior separating wall which can be soldered according to the invention.
Figure 4:
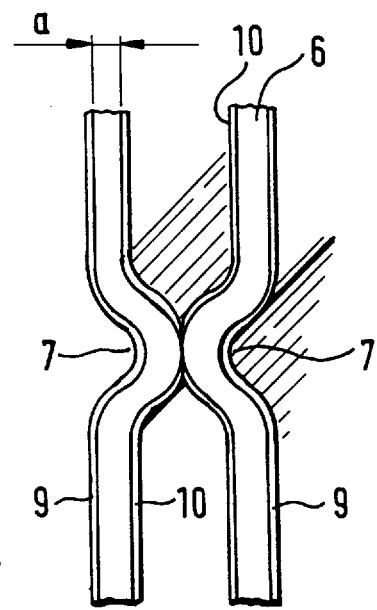
FIG. 4 is an enlarged representation of the cutout IV of FIG. 3.

According to FIGS. 3 and 4, a flat tube 6 is provided which is constructed as a welded tube; that is, it is developed from an at first plane sheet bar by the mounting of beads 7 and the bending up into its final shape before a weld seam, which is not shown in detail, is made on one of the narrow sides 8.

The flat tube 6 consists of an aluminum manganese copper alloy (AlMnCu).

Before the bending-up and the welding into the tube shape, the starting material is provided on both sides with a solder coating, specifically such that the later formed exterior side has a layer 9 (see FIG. 4) with a thickness of approximately 10% of the tube wall thickness "a". This solder layer is an AlSi alloy and may, for example, be AlSi 10. The interior side of the flat tubes 6 is provided with a layer 10 of an AlSi alloy, for example, also AlSi 10, with an addition of from 0.2 to 1.5% magnesium. This layer 10 has a layer thickness of approximately 5% of the tube wall thickness "a".

As in the embodiment of FIGS. 1 and 2, the thus constructed tubes 6 are combined in a known manner to form a heat exchanger, are kept sealed on their ends and are sprayed with the fluxing agent required for the subsequent soldering operation. After the drying of this fluxing agent on the exterior side, which fluxing agent cannot reach the interior sides of the tubes, the heat exchanger is placed in the solder furnace and is soldered together there according to the "NOCOLOK" process.

It was found that in this manner also the domes placed against one another of the beads pressed toward the inside by half their interior width can be soldered to one another in a firm and durable manner without the requirement of a high-expenditure fluxing of the interior side of the tube.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for manufacturing hard-soldered aluminum heat exchangers comprising depositing a solder-containing layer and a non-corroding fluxing agent on exterior surfaces of flat tubes and, after a drying via heating in an inert atmosphere, causing a connection of beads pressed-in laterally by approximately half an interior width on said flat tubes, resulting in a continuous supporting wall, the process further comprising the steps of:

using welded flat tubes made of an Al-alloy as said flat tubes; and providing on said exterior surfaces of said flat tubes a first coating of an AlSi alloy and, on said interior surfaces, a second coating of an AlSi alloy with an addition of from 0.2 to 1.5% Mg.

2. A process according to claim 1, wherein said inert atmosphere is a nitrogen atmosphere.

3. The process according to claim 1, wherein said flat tubes are provided with a narrow interior width.

4. The process according to claim 1, wherein said second coating of the flat tubes has a thickness of approximately 5% of the tube wall thickness "a".

5. The process according to claim 1, wherein said first coating has a thickness of approximately 10% of the tube wall thickness "a".

6. A process for manufacturing hard-soldered aluminum heat exchangers comprising the steps of depositing a solder-containing layer and a non-corroding fluxing agent on exterior surfaces of flat tubes and, after a drying via heating in an inert atmosphere, forming a connection with other parts, wherein the step of depositing further comprises the steps of:

using flat tubes made of an Al-alloy; and providing on an outside surface of said flat tubes a solder coating of an AlSi alloy while leaving an inside surface bare; and wherein the step of forming a connection further comprises the steps of;

providing as said other parts turbulence inserts that have an insert coating of AlSi 10 with an addition of from 0.2 to 1.5% Mg on both sides of each of the turbulence inserts; and inserting the turbulence inserts into said flat tubes.

7. A process according to claim 1, wherein said inert atmosphere is a nitrogen atmosphere.

8. The process according to claim 6, wherein said solder coating of the flat tubes has a thickness of approximately 10% of a tube wall thickness "a".

9. The process according to claim 1, wherein said insert coating of the turbulence inserts has a thickness of approximately 10% of the thickness "b" of a turbulence plate.

10. The process according to claim 6, wherein said flat tubes are provided with a narrow interior width.

11. The process according to claim 9, wherein said solder coating of the flat tubes has a thickness of approximately 10% of a tube wall thickness "a".

12. The process according to claim 2, wherein said-insert coating of the turbulence inserts has a thickness of approximately 10% of the thickness "b" of a turbulence plate.

* * * * *